United States Patent [19]

Ames, III

[11] Patent Number: 4,598,847

[45] Date of Patent: Jul. 8, 1986

[54] LOCK BRACKET FOR BICYCLES

[76] Inventor: John T. Ames, III, 12330 Tomanet Trail, Austin, Tex. 78758

[21] Appl. No.: 580,732

[22] Filed: Feb. 16, 1984

[51] Int. Cl.⁴ ............................................. B62J 11/00
[52] U.S. Cl. ........................................ 224/39; 211/5; 248/499
[58] Field of Search ............... 211/5; 248/499, 503, 248/231.1, 304; 24/326; 224/30 R, 30 A, 37, 42, 39, 32 A; 70/58, 233

[56] References Cited

U.S. PATENT DOCUMENTS

| | | | |
|---|---|---|---|
| 302,462 | 7/1884 | Zacharias | 224/30 R |
| 538,965 | 5/1895 | Hesse | 224/30 R |
| 3,167,284 | 1/1965 | Lynch | 224/30 R |
| 4,313,548 | 2/1982 | Edelson | 224/42 X |
| 4,436,232 | 3/1984 | Zane et al. | 248/503 X |

FOREIGN PATENT DOCUMENTS

| | | | |
|---|---|---|---|
| 49904 | 4/1982 | European Pat. Off. | 70/233 |
| 2355708 | 1/1978 | France | 224/30 R |
| 243951 | 8/1946 | Switzerland | 224/30 R |
| 14782 | of 1885 | United Kingdom | 248/304 |

*Primary Examiner*—Robert W. Gibson, Jr.
*Assistant Examiner*—Blair M. Johnson

[57] ABSTRACT

This lock bracket is for bicycles, and serves to render a common bicycle lock secure to the frame of a bicycle. Primarily, it consists of a plate, which is secured to one end of the bicycle lock, and an elastic shock cord is provided, to further render the lock secure to the bicycle.

1 Claim, 3 Drawing Figures

U.S. Patent  Jul. 8, 1986  4,598,847
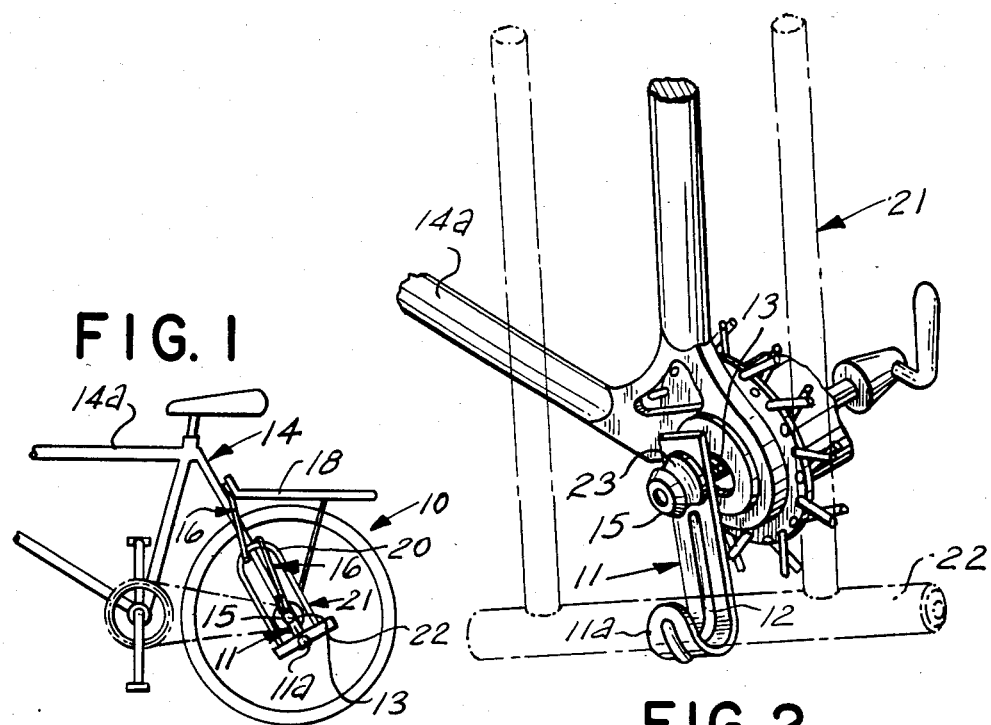
FIG. 1
FIG. 2
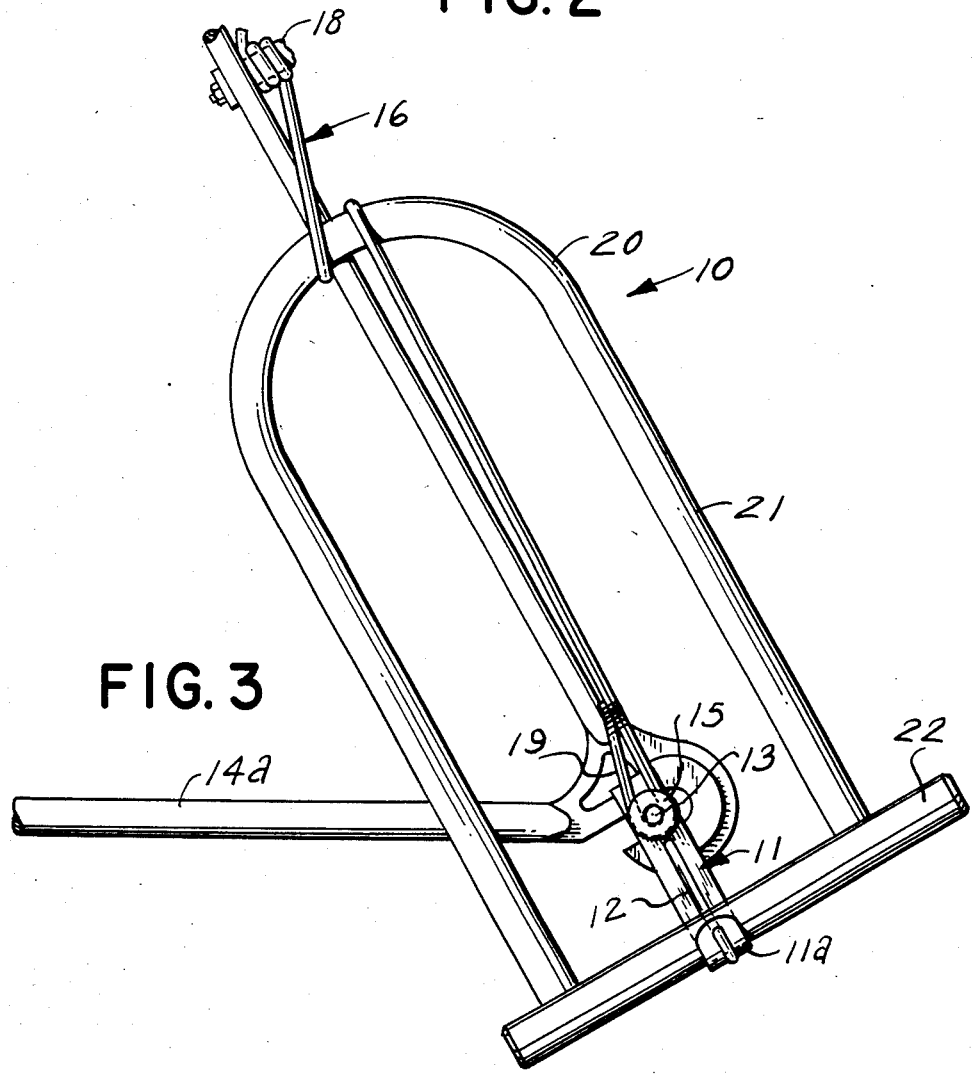
FIG. 3

LOCK BRACKET FOR BICYCLES

This invention relates to security devices, and more particularly, to a lock bracket for bicycles.

The principal object of this invention is to provide a lock bracket for bicycles, which will be unique in design, in that it will hold a bicycle lock against the bicycle frame.

Another object of this invention is to provide a lock bracket for bicycles, which will have no moving components.

Another object of this invention is to provide a lock bracket for bicycles, which will be adaptable for the employment of any standard "U"-shaped lock, that can rest in its arc for travel or storage.

A further object of this invention is to provide a lock bracket for bicycles, which will be held to, but not limited to, the nut fastener of the rear axle skewer assembly, and the device lowers the center of mass of a moving bicycle, and positions the lock weight low and on opposite sides to the drive chain and gear weights, the result being, that the handling characteristics of the bicycle are substantially improved.

A still further object of this invention is to provide a lock bracket for bicycles, which will enable accessories to be used in the fore triangle, where many locks are carried in the prior art, and the device will be easily installed or removed, and it will require no special tools or skills.

An even further object of this invention is to provide a lock bracket for bicycles, which may be used with or without a luggage rack, and the lock will be vary stable when used with the device, thus substantially reducing the chances of a loose load while traveling.

Other objects are to provide a lock bracket for bicycles, which is simple in design, inexpensive to manufacture, rugged in construction, easy to use, and efficient in operation.

These, and other objects, will be readily evident, upon a study of the following specification, and the accompanying drawing, wherein:

FIG. 1 is a side elevational view of a bicycle, showing the present invention secured thereto;

FIG. 2 is an enlarged fragmentary perspective view of the rear wheel frame mount, showing the bicycle lock in phantom lines, and resting within the axle mounted member, and FIG. 3 is a fragmentary side elevational view of the bicycle frame, showing the invention secured thereto.

Accordingly, a lock device 10 is shown to include a "J"-shaped bracket 11, having a stiffening rib 12 formed therein. An opening through the upper portion of bracket 11 (which is not shown), freely receives the rear axle 13 of the bicycle 14, and the axle nut 15, received on axle 13, serves to lock bracket 11 in place, and it shall be noted, that the best position for the device 10 is against the rear frame on the opposite side of the drive chain and gears. A shock cord 16, fabricated in the manner known in the art, is secured to the bicycle rack 18 or other local area, at one end, and its opposite end may be formed into a loop 19 in a suitable manner, and may be received on the skewer axle nut 15, if desired, so as to hold the "U"-shaped portion 20 of lock 21 against tthe bicycle frame 14a. The tubular cross-bar portion 22 of lock 21 is received in the hook 11a of bracket 11, and is held within the hook 11a thereof, by being secured fixedly thereto, by suitable means (not shown). In the above described suspension means, the shock cord 16 is looped over the arcuate portion of the lock 21, and preferably, the nut 15 includes an annular groove 23 in its outer periphery, for receiving the loop 19 of shock cord 16. However, groove 23 is not absolutely essential for retaining the loop 19 of shock cord 16, and it shall be noted, that other portions of bicycle 14 may be employed to secure shock cord 16 and lock 21, by bracket 11 means, if desired.

In use, nut 15 is removed from axle 13, and bracket 11 is placed thereon, by means of the opening therethrough. The nut 15 is then replaced on axle 13, and tightened. The shock cord 16 is then received on the outer periphery of nut 15, by is loop 19, and the opposite end is looped over the arcuate portion of lock 21, and is securely fastened to rack 18 of bicycle 14, or other portion of 14.

While various changes may be made in the detail construction, it is understood that such changes will be within the spirit and scope of the present invention, as is defined by the appended claims.

What I now claim is:

1. A lock bracket for bicycles, comprising, in combination, a "J"-shaped plate member, a stiffening rib extending longitudinally along said member, one end of said member forming a straight shank while an opposite end forms a rounded hook, an opening in a terminal end of said shank for receiving a rear axle of a bicycle and being located between a wheel and an axle end nut thereof, and a length of shock cord having a loop formed at its one end, an annular groove around said nut, said cord loop being removably received around said nut groove while a longitudinally intermediate portion of said cord is wrapped around a "U"-end portion of a bicycle lock having a transverse tubular cross-bar at its opposite end portion removably seated in said hook, and an opposite end of said cord is removably secured to a rear frame of said bicycle.

* * * * *